United States Patent [19]

Misumi

[11] Patent Number: 4,683,760
[45] Date of Patent: Aug. 4, 1987

[54] VORTEX FLOW METER

[75] Inventor: Masao Misumi, Tokyo, Japan

[73] Assignee: Oval Engineering Co., Ltd., Tokyo, Japan

[21] Appl. No.: 637,924

[22] Filed: Aug. 6, 1984

[30] Foreign Application Priority Data

Aug. 15, 1983 [JP] Japan ................................ 58-148928
Dec. 27, 1983 [JP] Japan ......................... 58-204538[U]

[51] Int. Cl.⁴ .............................................. G01F 1/32
[52] U.S. Cl. ................................................. 73/861.22
[58] Field of Search ............ 73/861.22, 861.23, 861.24

[56] References Cited

U.S. PATENT DOCUMENTS

| 1,374,359 | 4/1921 | Collins | 73/861.65 |
| 3,564,915 | 2/1971 | Tomota et al. | 73/861.24 |
| 3,722,273 | 3/1973 | Yamasaki et al. | 73/861.22 |
| 3,751,982 | 8/1973 | Lambert | 73/861.66 |
| 3,796,095 | 3/1974 | Fussell, Jr. | 73/861.24 |
| 3,940,986 | 3/1976 | Yamasaki et al. | 73/861.23 |
| 4,161,878 | 7/1979 | Fussel, Jr. | 73/861.24 |
| 4,173,143 | 11/1979 | Venton-Walters | 73/861.22 |
| 4,257,277 | 3/1981 | Klobe | 73/861.24 |
| 4,416,159 | 11/1983 | Williamson et al. | 73/861.22 |
| 4,440,027 | 4/1984 | Focht | 73/861.24 |

Primary Examiner—Herbert Goldstein
Attorney, Agent, or Firm—Jordan and Hamburg

[57] ABSTRACT

A vortex flow meter is comprised of a vortex generator provided in a fluid to be measured and a tube member installed in a direction intersecting with it at the downstream side. The tube member includes at least a couple of holes arranged at intervals of predetermined distances in the direction of the shaft. A pressure variation due to the Karman vortex created by the vortex generator is applied to the fluid in the tube member through the above-mentioned holes. A detector for sensing the pressure variation is installed in the tube member. The number of Karman vortexes is counted by the pressure variation detector.

11 Claims, 15 Drawing Figures

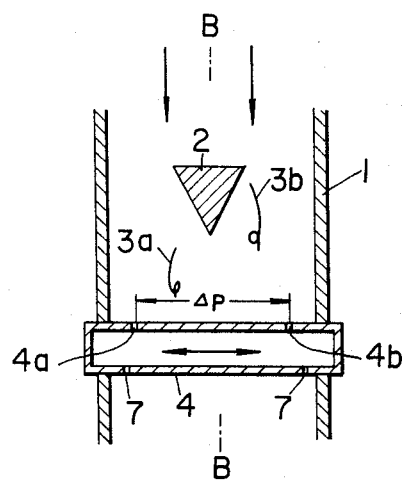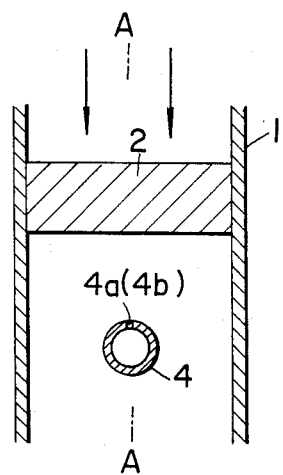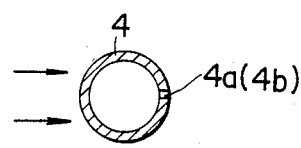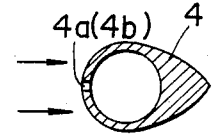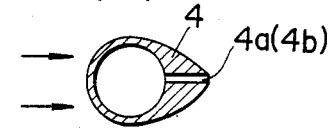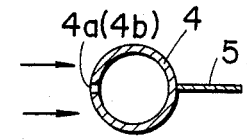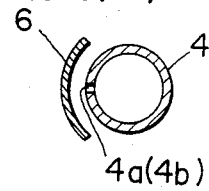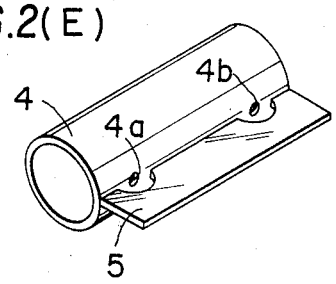

VORTEX FLOW METER

BACKGROUND OF THE INVENTION

The present invention relates to a vortex flow meter utilizing the Karman vortexes created by a bluff body or a vortex generator disposed in a fluid.

As is well known, when a pillar-shaped bluff body is placed in a fluid, the flow of the fluid peels off to both side surfaces of the bluff body and a regular vortex train, that is, Karman vortexes occur alternately to the downstream side of the bluff body. The number of Karman vortex occurrences is proportional to the velocity or quantity of fluid flowing. The quantity of flow can be measured by counting the number of Karman vortexes.

However, in the conventional manner, an ultrasonic wave is used to count the number of Karman vortexes and the frequency modulation or the phase modulation is detected thereby. The accuracy of this method is effected by external noises or the like thus resulting in errors in measurement. Since the ultrasonic wave scatters about, the power of the signal received is considerably diminished. Furthermore the flow of the fluid is effected at a place near the vortex so that the ratio of S/N (signal/noise) is lowered due to the interference with the turbulence of the vortex. It may be another reason for inacurracies in measurement. Furthermore, the measurement of the fluid's flow is badly effected by interference from the reflection of the wave off the wall. surface opposite the transmitted ultrasonic wave. Usually, in order to prevent such an effect, a sound absorbing material like woven cotton or woolen cloth is placed on the inner wall surface of the tube in such a manner that the measuring of the fluid's flow can be effectively done in a purified liquid. It cannot be done effectively in the case of dirty or impure liquid that is mixed with dust, mist, etc.

It is for the above reasons that the present applicant has proposed a method in which no sound absorbing material is needed. This method is one in which another tube is passed through the wall of the fluid-flowing tube so as to intersect with the vortex generator at the downstream side. The variation of the flow of the liquid is due to the pressure variation caused by pressure guiding holes bored at a place near each of the wall surfaces of the tube member. It is detected by ultrasonic wave transmitting and receiving apparatuses which are installed respectively at both ends of the tube.

However, in such a manner as described heretofore, it may be necessary to provide heat-proof type ultrasonic wave transmitting and receiving apparatuses in the case of measuring fluids with high temperatures. It follows then that the cost for manufacturing the device proposed will be highly increased. Furthermore there will exist the inconvenience of removing the main body of the flow meter from the connecting tubes.

SUMMARY OF THE INVENTION

In consequence, the primary object of the present invention is to provide a vortex flow meter which is not effected by external noises or the like and which is capable of counting precisely the number of Karman vortexes.

Another object of the present invention is to provide a vortex flow meter which is comprised of a bluff body disposed in a fluid to be measured, a tube member which is placed in a direction intersecting with said bluff body at a downstream side thereof, and at least a couple of holes arranged at intervals of predetermined distances in the direction of a shaft, and finally which detects the pressure variation of fluid in the tube member.

Still another object of the present invention is to provide a vortex flow meter for the purpose of precisely measuring the flow of fluid in which the measurement of the Karman vortexes is performed inside of a tube that is not effected by external turbulence.

Still another object of the present invention is to provide a vortex flow meter in which the flow of fluid due to the pressure differences caused by the vortexes is rectified and in which the scattering of ultrasonic wave is eliminated, and in which the measurement of Karman vortexes can be done precisely without being effected by external turbulence.

Still another object of the present invention is to provide a vortex flow meter which is not effected by external turbulence and which has a hole for guiding the fluid pressure variation caused by Karman vortexes. The hole thereof may not be clogged by dust mixed into the fluid to be measured.

Further stil, another object of the present invention is to provide a vortex flow meter which is comprised of a bluff body placed in opposition to the flow of fluid in a tube member and another tube member which passes through its wall in a direction intersecting with the bluff body at its downstream side, and in which the variation of pressure caused by the bluff body outside of the tube member is guided into the other tube member and the pressure variation is detected inside of it.

Still. another object of the present invention is to provide a vortex flow meter in which the fluid pressure variation, due to a Karman vortex is guided into a tube member, the internal, middle portion of the tube member is closed, the pressure variation guided into a tube member is further guided into a bypass fluid passage, and the flow of the fluid is detected in the bypass fluid passage by use of ultrasonic wave-transmitting and receiving apparatuses.

According to the present invention, a device for measuring the flow of fluid can be manufactured at a lower cost; the maintenance or monitoring work can be simplified considerably; and the new device can be safer than a conventional one.

The above-mentioned objects, characteristics, and merits of the present invention will be clearly explained in a detailed description of the invention together with accompanying drawings.

BRIEF DESCRIPTION OF THE DRAWINGS

FIG. 1 is a cross-sectional view for explaining the construction of a vortex flow meter's main portion according to the present invention. In FIG. 1, FIG. 1 (A) is a cross-sectional view taken on line A—A of FIG. 1 (B), and FIG. 1 (B) is a cross-sectional view taken on line B—B of FIG. 1 (A).

FIGS. 2 (A) through (F) are cross-sectional views showing modifications of the hollow members that can be used in the present invention.

DESCRIPTION OF THE PREFERRED EMBODIMENTS

Figure 3:
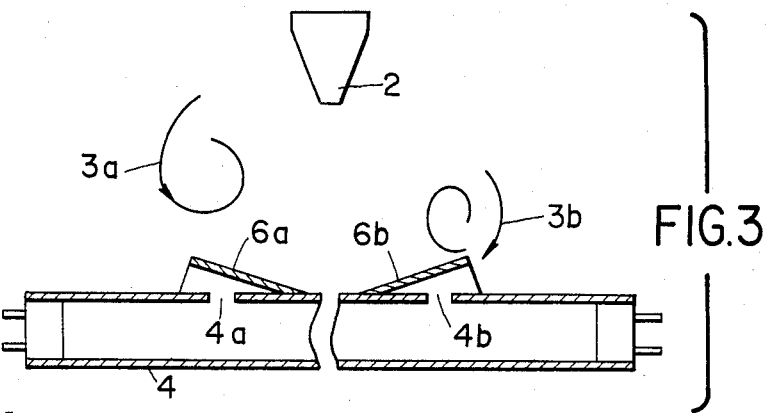
FIG. 3 is an enlarged cross-sectional view showing the construction of a vortex flow meter's main portion according to the present invention.

FIG. 1 is a cross-sectional view for showing the construction of a vortex flow meter's main portion that is the embodiment of the present invention.

FIG. 1 (A) is a cross-sectional view taken on line A—A of FIG. 1 (B), and FIG. 1 (B) is a cross-sectional view taken on line B—B of FIG. 1 (A).

In FIG. 1, 1 is a fluid-flowing tube; 2, a well known bluff body or vortex generator; 3a and 3b, Karman vortexes created by the bluff body 2; and 4, a tube member established according to the present invention. The tube member 4 is established at the downstream side of the bluff body 2 in the direction intersecting perpendicularly to the bluff body 2 and has at least a couple of holes 4a and 4b, arranged at intervals of predetermined distances in the direction of the shaft.

However, as is well known, the pressure at the side of hole 4a decreases when the Karman vortex 3a is generated, and the pressure at the side of hole 4b decreases also when the Karman vortex 3b is generated. The pressure variation effects the fluid in the tube member 4 through holes 4a and 4b resulting in alternating pressure differences ΔP in tube member 4 as shown by an arrow.

Consequently, if the movement of the fluid, the pressure difference thereof, or the like is measured by use of optional desired means, for instance, an ultrasonic wave, a laser beam, a pressure-sensitive element, etc., then the number of Karman vortex occurrences can be measured thereby.

FIGS. 2 (A) through (F) are cross-sectional views showing modifications of the afore-mentioned tube member. FIG. 2 (A) shows an example of arranging the holes 4a and 4b at the downstream side of the tube member 4. FIG. 2 (B) shows another example of forming the downstream side of the tube member 4 in a streamline manner and for preventing it from generating a Karman vortex. The Karman vortexes generated by the tube member 4 might probably effect the fluid in it through holes 4a and 4b which are placed in it. FIG. 2 (C) shows another example of arranging the holes 4a and 4b in a streamline at the downstream side of the tube member 4. FIG. 2 (D) shows another example of installing a partition plate 5 parallel with the tube member 4 at the downstream side of the cylinder-shaped tube member 4 and of preventing it from generating a Karman vortex. FIG. 2 (E) shows another example of arranging the holes 4a and 4b at the downstream side of the tube member 4 in which a partition plate is installed. FIG. 2 (F) shows another example of installing a dust-proof plate 6 at the upstream side of the tube member 4, preventing the holes 4a and 4b from being clogged up by dust or the like, and for further preventing dust from entering therein through the holes 4a and 4b. The dust-proof plate 6 can be installed only at the upstream side of the tube member 4.

Moreover, the vortex flow meter according to the present invention is applicable to either liquid or gas. In the case of measuring the flow of gas, especially high temperature vapor, etc., as shown in FIG. 1 (A), it may be preferable to provide a drainage hole 7 in tube member 4 and to drain the water vapor that has accumulated through drainage hole 7. The example of arranging a couple of holes 4a and 4b in the tube member 4 is explained heretofore. However, it be may easily understood that the holes are not limited to a couple only and do not always have to be in pairs.

FIG. 3 is an enlarged cross-sectional view showing the main portion of another embodiment according to the present invention. In the embodiment shown in FIG. 3, dust-proof plates 6a and 6b covering holes 4a and 4b of tube member 4 are unitarily provided. In such a manner, dirt, dust, etc. do not enter into tube member 4 through holes 4a and 4b when they are directed to either the upstream side or the downstream side of it. On that occasion, the opening portion of the dust-proof plates 6a and 6b is situated at the vortex side as shown in FIG. 3 so as to effectively guide the pressure variation due to the vortex into tube member 4.

As is apparent from the foregoing description, according to the present invention, the measurement of the fluid flow can be performed precisely since the number of Karman vortexes occurring in the tube member are not effected by external turbulence.

Figure 4:
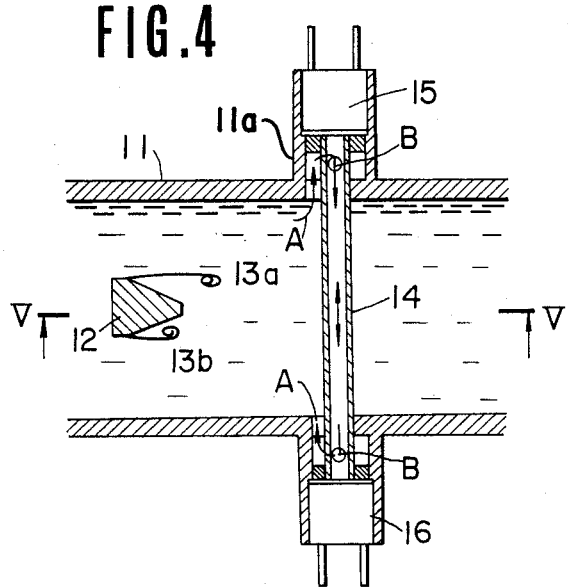
FIG. 4 is a cross-sectional view for explaining another embodiment of the vortex flow meter according to the present invention.
Figure 5:
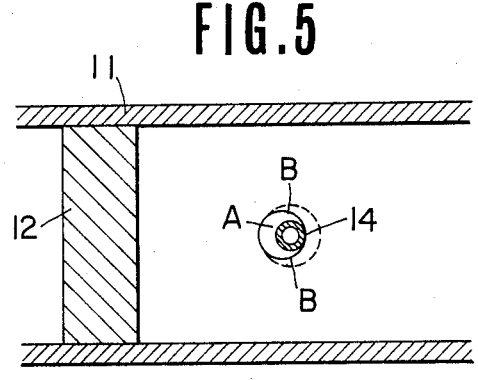
FIG. 5 is a cross-sectional view taken on line V—V of FIG. 4.

FIG. 4 is a cross-sectional view for explaining the main portion of another embodiment of the vortex flow meter according to the present invention. FIG. 5 is a cross-sectional view taken on line V—V of FIG. 4. In FIGS. 4 and 5, 11 is a fluid-flowing tube in which the fluid to be measured flows; 12, is a well known vortex generator or bluff body; 13a and 13b are Karman vortexes created by the bluff body; and 14 is a tube member. Tube member 14 is a hollow member installed at the downstream side of the bluff body 12 and intersecting with it. Then in the embodiment of the present invention, the tube member 14 is installed in a space passing through the hole A bored in the wall of the fluid-flowing tube 11, and the hole B is bored at the external portion of the fluid-flowing tube 11. The tube member 14 extends into a wall part 11a.

Consequently, according to the embodiment of the present invention, the pressure variation of the fluid to be measured due to the Karman vortex created by the bluff body 12 is guided into the tube member 14 through the holes A and B, and then the pressure variation in the tube member 14 or the fluid flow variation due to the pressure variation is detected by sensing apparatuses for instance, an ultrasonic wave transmitter 15 and an ultrasonic wave receiver 16. By such means, the measurement of the velocity or quantity of the fluid is performed.

As mentioned heretofore, according to the embodiment, a hole A guiding a fluid pressure variation due to the Karman vortexes is bored into the wall of the fluid-flowing tube forming a passage for carrying the fluid to be measured, and another hole B, guiding fluid pressure variation due to Karman vortexes, is bored in the tube member 14 at the external side of the tube wall. Therefore, the measurement of the fluid flow is hardly effected by the noise generated in the fluid-flowing tube 11. Furthermore since the fluid flow due to the fluid pressure variation caused by Karman vortexes is rectified, the quality of the detected wave form is largely improved. Also the hole B guiding fluid pressure variation caused by Karman vortexes can be enlarged so that the measurement of the fluid flow is hardly effected by dust or the like in the fluid-flowing tube 11. As a result, the pressure variation due to Karman vortexes can be effectively detected. Since the pressure guiding hole B can be bored perpendicularly to the fluid-flowing tube 11 as shown in FIG. 5, the measuring may be effectively performed in the presence of water (or moisture), dirt, dust, or the like. Moreover, hole A is perpendicular to hole B so that the measuring may be effectively performed without being effected by external ultrasonic waves. The above features represent the merits of the flow meter according to the present invention.

Figure 6:
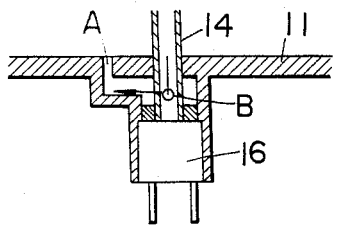
FIGS. 6 and 7 are views showing the construction of other embodiments of the present invention.

FIG. 6 is a cross-sectional view showing the main portion of the other embodiment of the present invention. In the embodiment, the pressure variation guiding hole A and the through-hole of the tube member 14 are bored separately. It may be easily understood that the embodiment shown in FIG. 6 may perform its functions as well as that shown in FIGS. 4 and 5.

Figure 7:
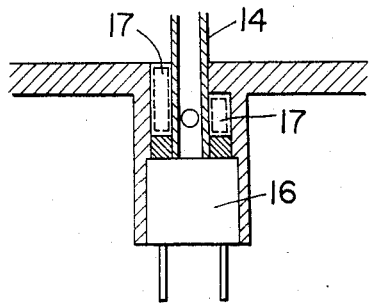

FIG. 7 is a cross-sectional view showing the main portion of still another embodiment of the present invention. In this embodiment, a sound-absorbing material 17 is mounted on the surface of the member situated at a place near the pressure-guiding hole B. It follows that the measurement of the signal to be detected will not be greatly effected by external turbulence which is caused by an ultrasonic wave entering the tube member.

Furthermore, in each of the afore-mentioned embodiments, a filter can be installed in the place near the fluid pressure-guiding hole A. The filter is comprised of a porous material, for example porous metal. In the case of installing a filter therein, it may be possible thereby to prevent dust from entering into the tube member and from mixing with the fluid to be measured.

As is apparent from the foregoing description, the vortex flow meter which is not effected by external turbulence can be provided according to the afore-mentioned embodiments of the present invention. Furthermore, in the vortex flow meter, the fluid pressure-guiding hole will probably not be clogged by dust mixed into the fluid to be measured.

Figure 8:
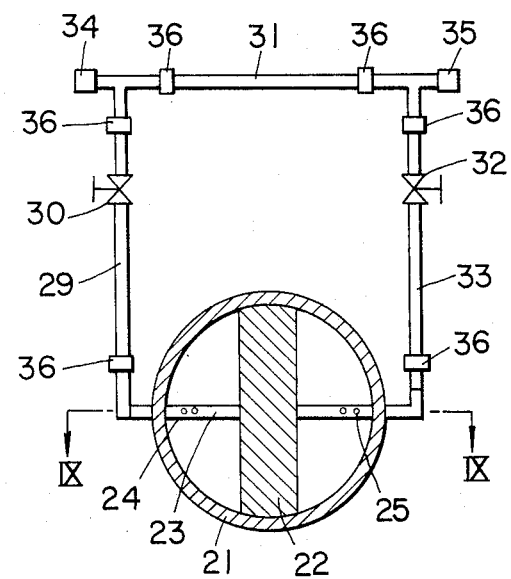
FIG. 8 is a cross-sectional view showing the construction of another embodiment of the vortex flow meter taken along a plane running through the bluff body or Karman vortex generator and being perpendicular to the fluid-flowing passage.
Figure 9:
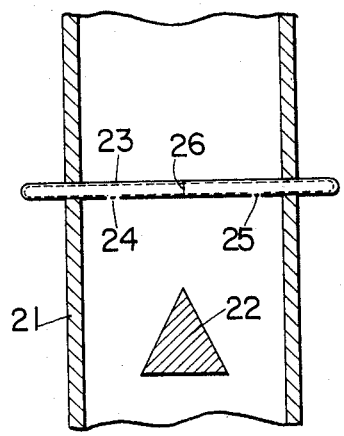
FIG. 9 is a cross-sectional view taken on line IX—IX of FIG. 8.

FIGS. 8 and 9 are cross-sectional views for explaining another embodiment of the present invention. FIG. 8 is a cross-sectional view including the bluff body or vortex generation 22 of the vortex flow meter according to the present invention and being shown on a plane that is perpendicular to the fluid-flowing passage 21. FIG. 9 is a cross-sectional view shown on line (shaft of the tube) IX—IX of the tube member 23 shown in FIG. 8. The line IX—IX intersects with the vortex generator 22 at the downstream side thereof and runs through the wall of the fluid-flowing passage 21.

Each of the pressure guiding holes 24 and 25 is bored at a place near the wall surface of the tube member 23. A partition wall 26 installed at the central portion thereof prevents the movement of the fluid between the pressure guiding holes 24 and 25. The partition wall 26 does not have to be perfectly air-tight. It is sufficient that the fluid flow, due to pressure variation, be stably displaced in the bypass, flowing passage to be mentioned hereinafter.

As already mentioned, the partition wall 26 does not always need to be completely at the central position of the fluid-flowing tube. The bypass flowing passage comprises of tubes 29, 31 and 33. The bypass tube 31 forms a straight flowing passage. An ultrasonic wave transmitter 34 and an ultrasonic wave receiver 35 are installed, respectively, at both end portions of the straight bypass flowing passage. An ultrasonic wave emitted from the ultrasonic wave transmitter 34 driven by an ultrasonic wave oscillator now shown in the figure is received by the ultrasonic wave receiver 35. The modulation of the ultrasonic wave due to fluid displacement between both ends of the straight flowing passage is applied to the detecting circuit and the amplifying circuit not shown in the figure. The amplifying circuit generates a vortex signal. The valves 30 and 32 are employed for adjusting or intercepting the fluid displacement in the straight flowing passage. Those valves are used mainly for the purpose of adjusting the bypass fluid flow so as to optimize the vortex signal and for intercepting the fluid flow at the time of checking the ultrasonic wave transmitter and receiver. The reference numeral 36 represents the joint or coupling for connecting the tubes with each other.

According to the afore-mentioned embodiment, even in the case of a fluid with a high temperature to be measured, the temperature is lowered at a place near the straight-flowing passage 31. Since the lowered value of the temperature increases in accordance with the length of the bypass flowing passage, a low-priced material like PTZ, etc. can be used as a material for the ultrasonic wave transmitter and receiver instead of a high-priced material such as niobic acid lithium having a characteristic of a high Curie point. Furthermore, it may be possible to adjust the vortex signal so as to detect the optimized signal by opening and closing the valves. Moreover, at the time of checking the vortex flow meter, the ultrasonic wave transmitter and receiver can be easily exchanged for another by shutting off the valves without removing the vortex flow meter from the fluid-flowing tubes. As is apparent from the foregoing description, the vortex flow meter according to the present invention has so many merits that it functions much more effectively when compared with the conventional one.

What is claimed is:

1. A vortex flow meter for measuring fluid flow in a conduit comprising a vortex generator disposed transversely in said conduit, a tube member in said conduit disposed downstream of said vortex generator within the stream of vortices, said tube member extending transversely of said conduit and transversely of said vortex generator, a partition wall means in said tube member which divides the tube member into a first tube part and a second tube part, means defining at least one hole in an intermediate portion of each of said tube parts, by-pass means external of said conduit and extending between said first and second tube parts such that the effect of said partition wall means and said holes provides a fluid flow in said by-pass means, said by-pass means having a straight line portion which smooths the flow of fluid through the by-pass means, and measuring means for measuring the flow of fluid in said straight line portion of said by-pass means which is indicative of the fluid flow through said conduit.

2. A vortex flow meter according to claim 1, wherein said measuring means comprises ultrasonic wave transmitting and receiving devices.

3. A vortex flow meter for measuring fluid flow in a conduit member comprising a vortex generator disposed in said conduit member so as to oppose the fluid flow therein, a tube member in said conduit member disposed downstream of said vortex generator within the stream of vortices, said tube member extending transversely of said vortex generator, said conduit member comprising a conduit wall having wall openings, said tube member passing through said wall openings in said conduit member, means defining a pair of opened pressure guiding holes in said tube member for guiding pressure variation caused by vortices generation, said opened guiding holes opening up on the downstream side of said tube member, and detecting means for detecting the variation of fluid flow passing through said tube member by measuring said pressure variation so that fluid flow in said conduit member is thereby measured.

4. A vortex flow meter for measuring fluid flow in a conduit comprising a vortex generator disposed in said conduit, a tube member in said conduit member disposed downstream of said vortex generator within the stream of vortices, said tube member extending transversely of said conduit and having an intermediate part which precludes communication between a first tube part and a second tube part, means defining at least one hole in each of said tube parts, by-pass means extending between said first and second tube parts such that the effect of the fluid at said holes effects a pressure variation in said first and second tube parts, said by-pass means comprising a linear flow path portion, said by-pass means comprising connecting portions between the longitudinal ends of said tube member and said linear flow path portion, and valves in said connecting portions, said valves being operable to adjust the flow of fluid in said by-pass means, and ultrasonic wave transmitting and receiving devices for measuring the flow of fluid in said by-pass means which is indicative of the fluid flow through said conduit, said ultrasonic wave transmitting and receiving devices being located at the longitudinal ends of said linear flow path portion, said ultrasonic wave transmitting and receiving devices detecting the variation of fluid flow flow in said linear flow path portion.

5. A vortex flow meter for measuring fluid flow in a conduit comprising a vortex generator disposed in said conduit, a tube member in said conduit disposed downstream of said vortex generator within the stream of vortices, said tube member extending transversely of said conduit and having an intermediate part which precludes communication between a first tube part and a second tube part, means defining at least one hole in each of said tube parts, by-pass means extending between said first and second tube parts such that the effect of the fluid at said holes effects a pressure variation in said first and second tube parts, and ultrasonic wave transmitting and receiving devices for measuring the flow of fluid in said by-pass means which is indicative of the fluid flow through said conduit, said by-pass means comprising a linear flow path portion, said ultrasonic wave transmitting and receiving devices being located at the longitudinal ends of said linear flow path portion, said ultrasonic wave transmitting and receiving devices detecting the variation of fluid flow in said linear flow path portion.

6. A vortex flow meter for measuring fluid flow in a conduit member comprising a vortex generator disposed in said conduit member, said conduit member having openings, a tube member in said conduit member disposed downstream of said vortex generator within the stream of vortices, said tube member extending transversely of said conduit and having longitudinal end portions which extend through said openings, and means defining a plurality of holes in said tube member disposed such that the effect of the fluid at said holes effects a pressure variation in said tube member indicative of the fluid flow through said conduit, said holes being disposed in said longitudinal end portions.

7. A vortex flow meter according to claim 6, wherein both end portions of said tube member are opened, said detecting means comprising an ultrasonic wave transmitting element disposed at one opened end portion of said tube member and an ultrasonic wave receiving element installed at the other opened end portion thereof.

8. A vortex flow meter according to claim 6 further comprising means defining wall parts extending laterally of said conduit, said longitudinal end portions of said tube member extending into said wall parts, said longitudinal end portions being spaced from said wall parts to define a passage space therebetween, and a passageway providing communication between said passage space and said conduit.

9. A vortex flow meter according to claim 8 further comprising sound absorbing material in said passageway.

10. A vortex flow meter according to claim 8 further comprising porous material in said passage space.

11. A vortex flow meter according to claim 8 further comprising porous material in said passageway.

* * * * *